United States Patent [19]

Kinson

[11] 4,361,055
[45] Nov. 30, 1982

[54] TORQUE CONVERTER

[75] Inventor: Robert Kinson, Mattydate, N.Y.

[73] Assignee: Juris Murnieks, Syracuse, N.Y.

[21] Appl. No.: 151,381

[22] Filed: May 19, 1980

[51] Int. Cl.³ .............................................. F16H 33/10
[52] U.S. Cl. .................................... 74/5.22; 74/5.34; 74/751
[58] Field of Search ............... 74/5 R, 5.22, 751, 5.34, 74/64

[56] References Cited

U.S. PATENT DOCUMENTS

| 2,052,507 | 8/1936 | Walton | 74/751 |
| 2,183,460 | 12/1939 | Lenox | 74/751 |
| 2,223,745 | 12/1940 | Stalker | 74/751 |
| 2,960,889 | 11/1960 | Keyser | 74/751 |
| 4,161,889 | 7/1979 | Hinds | 74/5 R |
| 4,169,391 | 10/1979 | Schonberger | 74/5 R |

Primary Examiner—Rodney H. Bonck
Attorney, Agent, or Firm—Bruns & Jenney

[57] ABSTRACT

A torque converter is disclosed which comprises a gimbal assembly having a gyroscope mounted for rotation within one of the rings thereof. The spin axle of the gyroscope and the entire gimbal assembly are adapted to rotate about the precessional axis of the gyroscope. The gimbal ring is further adapted to oscillate about a torque axis that is perpendicular to the precessional axis to set up gyroscopic forces in the converter. The spin axis of the gyroscope is independently connected to the output gear of a differential drive unit and the input gear of the unit is connected to the drive shaft of the engine. A planetary gear section is interposed between the input and output gears of the drive unit that is adapted to turn the loaded output shaft of the converter. Oscillating means rock the gimbal ring about the torque axis at some fixed multiple of the engine speed while the entire gimbal assembly is turned about the precessional axis at some fixed multiple of the load speed. A precessional force is thus applied to the differential drive unit which controls the amount of energy delivered from the engine to the load. A timing mechanism automatically adjusts the relative position of the spin axle in regard to the torque axis so that the engine speed to load speed ratio may be varied to give constant engine speed or constant load speed or any desired ratio of speeds.

29 Claims, 6 Drawing Figures

| FIG. 1A |
| --- |
| FIG. 1B |

TORQUE CONVERTER

BACKGROUND OF THE INVENTION

This invention relates to a torque converter and, in particular, to a torque converter that is capable of handling an infinitely variable number of different speed ratios between the input and the output thereof. More specifically, this invention relates to an improved torque converter that utilizes gyroscopically developed forces for controlling the transmission of energy from a prime mover to a load.

In U.S. Pat. No. 4,161,889 to Hinds, a constant torque power transmission is disclosed that operates on a gyroscopic principle to couple a power input to a load output. A high speed gyroscope is mounted within a gimbal and the gyroscope is oscillated to provide a precessional output force that is applied to a shaft in order to perform work. The gyroscope is used to develop a high torque that will drive a stalled or nearly stalled load. The torque developed by the gyroscope is thus used to augment the input power to the converter so as to develop an increased output.

Although the Hinds device operates well as a means for transmitting power, it nevertheless has certain inherent limitations that serve to limit usefulness. Most importantly, for any given input, the Hinds device will develop a related given output. Without changing the input, the output will remain constant. Accordingly, the speed ratio between the input and the output shafts can not be altered by the apparatus and the operation of the transmission can not be employed to relate input to output for the most efficiency possible. It should be further noted that the Hinds device is unable to provide a reverse drive function without altering or otherwise modifying the drive linkage.

SUMMARY OF THE INVENTION

It is therefore an object of the present invention to improve torque converters.

A further object of the present invention is to provide an infinitely variable gearbox that relies upon a gyroscopic principle for its operation.

A still further object of the present invention is to provide a torque converter that has an infinitely variable ratio of speeds between its input and its output.

Another object of the present invention is to increase the efficiency of an engine by providing a torque converter that will automatically hold the engine speed constant as load conditions change.

Still another object of the present invention is to eliminate the need for multi-gear transmission systems particularly in motor vehicles.

Yet another object of the present invention is to provide a torque converter able to reverse the load on the prime mover without changing the speed or direction of rotation of the prime mover.

And a still further object of the present invention is to improve the efficiency of torque converters.

These and other objects of the present invention are attained by a torque converter that includes a gimbal assembly having a gyroscope carried in one of its rings. Both the spin axle of the gyroscope and the entire gimbal assembly are arranged to rotate independently about the precessional axis of the gyroscope. The ring in which the gyroscope is mounted is further adapted to oscillate about a torque axis that is perpendicular to the precessional and the spin axes whereby inertial forces can be established in the converter. The spin axle of the converter is coupled to the output gear of a differential drive unit whose input gear is coupled to an engine or the like. A planetary gear section acts between the input and output gears and is connected to the loaded output shaft of the converter. Oscillating means are adapted to rock the gimbal ring about the torque axis at a fixed multiple of the engine speed while rotating means simultaneously turn the gimbal assembly about the precessional axis at some fixed multiple of the load speed whereby a precessional force is applied to the differential drive unit which serves to control the amount of energy delivered from the engine to the load.

A timing mechanism is provided which senses the engine speed and in response thereto automatically adjusts the time at which the spin axle of the gyroscope crosses the torque axis.

BRIEF DESCRIPTION OF THE DRAWINGS

For a better understanding of these and other objects of the present invention, reference is had to the following detailed description of the invention which is to be read in conjunction with the accompanying drawings; wherein.

DESCRIPTION OF THE INVENTION

Figure 1:
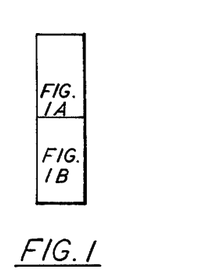
FIG. 1 is a two-part perspective view including parts 1a and 1b showing a torque converter embodying the teachings of the present invention.

Referring initially to FIG. 1, there is illustrated a torque converter, generally referenced 10, that embodies the teachings of the present invention. The converter includes a main drive shaft 11 that is coupled by any suitable means to a prime mover 12 which will hereinafter be referred to as an engine. The main drive shaft is securely affixed to the main drive gear 13 of the system so that the gear turns with the shaft at engine speed. The distal end of the main drive shaft is secured to a bevel gear 14 that is the power input gear to a drive differential unit generally referenced 15. The differential unit also contains an output gear 16 located opposite te input gear and a planetary section made up of two opposed planetary gears 17 and 18 that are secured to a ring gear 20 via hub 21.

In practice, the planetary gears are in mesh with both the input and output gears of the drive differential unit and are adapted to drive the ring gear about the central axis of the unit. The ring gear is held in mesh with the output drive pinion 23 of the torque converter which, in turn, functions to rotate the loaded output shaft 25 of the system. Although not shown, the output shaft 25 may be operatively connected to any suitable load. For the purpose of explanation, it will herein be assumed that the shaft is suitably coupled to the wheels of a motor vehicle. Accordingly, the loaded output shaft will be assumed to be turning at wheel speed.

As can be seen, the amount of energy that is delivered from the prime mover to the output drive shaft is a function of the holding force exerted by the output bevel 16 upon the differential unit. In the event the output bevel is locked in a stationary condition, full power is delivered from the engine to the wheel shaft. On the other hand, if the output bevel has less resistance to the input bevel than does the wheel shaft, the wheel shaft will not be turned by the engine. As will be explained in greater detail below, this feature of a differential or planetary gear system is herein utilized to regulate the amount of engine power that is delivered to the load.

Figure 2:
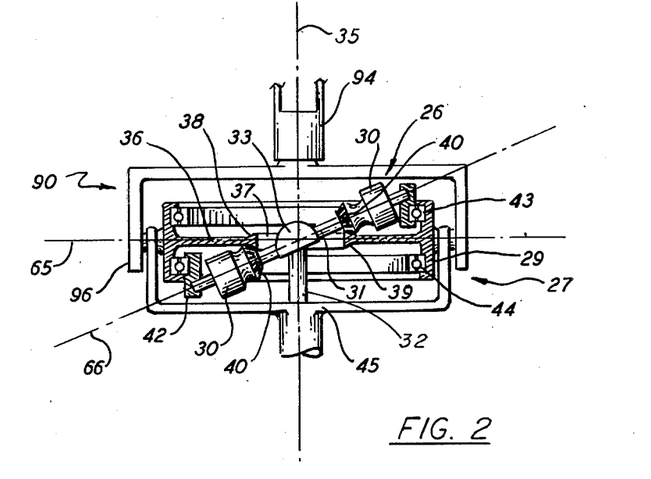
FIG. 2 is a partial front plan view in section showing the ring of a mounting gimbal used in the torque converter illustrated in FIG. 1 illustrating a gyroscope contained therein.

The torque converter of the present invention includes a gyroscope mechanism 26 that is contained within a gimbal assembly 27. As best illustrated in FIG. 2, the gyroscope is mounted for rotation within the inner ring 29 of the gimbal assembly. The gyroscope further includes a pair of wheels 30–30 that are rotatably supported some distance from the center of a spin axle 31. The spin axle is supported upon the terminal end of the drive differential output shaft 32 by a universal joint 33. By means of the universal joint arrangement, the gyroscope is made to spin about precessional axis 35 which also represents the central axis of the gimbal assembly. It should be noted at this juncture that the gyroscope is able to spin independently within the gimbal ring.

The inner ring of the gimbal assembly contains a plate-like rib 36 that has a central opening 37 in which the universal joint of the gyroscope is situated. A top bevel gear hub 38 and a bottom bevel gear hub 39 are formed about the periphery of the opening contained in the rib. The spin axle is canted within the opening to position one of the gyroscope wheels above the rib and the other below the rib. Each wheel has a circular bevel gear 40–40 formed or otherwise mounted upon its inner face which meshes with the bevel hub of the rib and causes the wheels to turn as they are spun by shaft 32. Accordingly, the wheels are turned at a relatively high speed as the axle moves about the precessional axis 35.

The two outer ends of the spin axle are each supported within bearing blocks 42–42 adapted to ride along the inner race of bearings 43 and 44 that are contained in the inner wall of the gimbal ring 29. The blocks are arranged to move easily about the ring with little or no friction whereby the gyroscope is able to develop high inertial force. Although two separate wheels are utilized in the present embodiment of the invention, it should be evident to one skilled in the the art that any number of wheels may be similarly employed without departing from the teachings of the present invention.

The gimbal assembly of the present invention, is addition to the noted inner ring, also includes an outer ring referenced 45. The outer ring is securely mounted upon the hub 46 of a gimbal drive gear 47 that is adapted to be rotated independently about the gyroscope drive shaft 32. By this arrangement the entire gimbal is able to turn about the precessional axis of the gyroscope. The gimbal drive gear 47 is driven by a timing gear 48 that is in mesh therewith. The timing gear is connected via shaft 49 to the output bevel of a second control differential unit 51. The planetary section of this second control differential includes a pair of planet bevels 53 and 54 that are attached to ring gear 55 via hub 56. The ring gear 55 meshes with the ring gear 20 of the first differential unit. The input bevel 57 of the second unit is coupled to a pinion 58 by means of shaft 59. The pinion in turn is operated by a coacting rack 60 that is instroked or outstroked via a hydraulically operated control cylinder 61. The exact function of the control cylinder shall be more thoroughly explained below. It should be noted at this point, however, that the second differential unit is adapted to turn the gimbal unit through gears 47 and 48 about the precessional axis of the gyroscope at a fixed multiple of the loaded output shaft 25 speed.

The inner ring 29 of the gimbal is mounted within the outer ring 45 upon a pair of rocker arms 63–63 so that the inner ring can be rocked or oscillated about a torque axis 65. The torque axis is perpendicular to the precessional axis of the gyroscope and crosses the precessional axis at the same point as the spin axis 66 of the gyroscope. The inner ring is oscillated about the torque axis by means of an oscillator system, generally referenced 68, so that the gyroscope will be induced to generate inertial forces within the torque converter.

The oscillator system basically gains its power from the input drive shaft 11 to cause the gimbal ring 29 to be rocked about the torque axis. A gear 70 is mounted in meshing contact with the main drive gear 13 and is adapted to turn the vertical shaft 71 at engine speed. The upper end of the vertical shaft is connected to a horizontal shaft 73 via a pair of coacting miter gears 74 and 75. The horizontal shaft, in turn, is coupled to a motion-converting assembly 76 by means of a drive pinion 77. With specific reference to FIG. 1a, the motion-converter assembly consists of a central gear 79 that is mounted between a pair of axially-extended bearings 80 and 81 which are concentric with the gear 79. In assembly, the concentric bearings are mounted in receiving ports 83—83 formed in a stationary bracket 84. Although not shown, bracket 84 is securely mounted in assembly to prevent it from moving when placed under operating loads. A pair of eccentric rollers 85 and 86 are contained within the motion-converting assembly. The inner roller 86 has an offset shaft 87 secured therein with both ends of the shaft extending outwardly from the assembly.

Figure 1A:
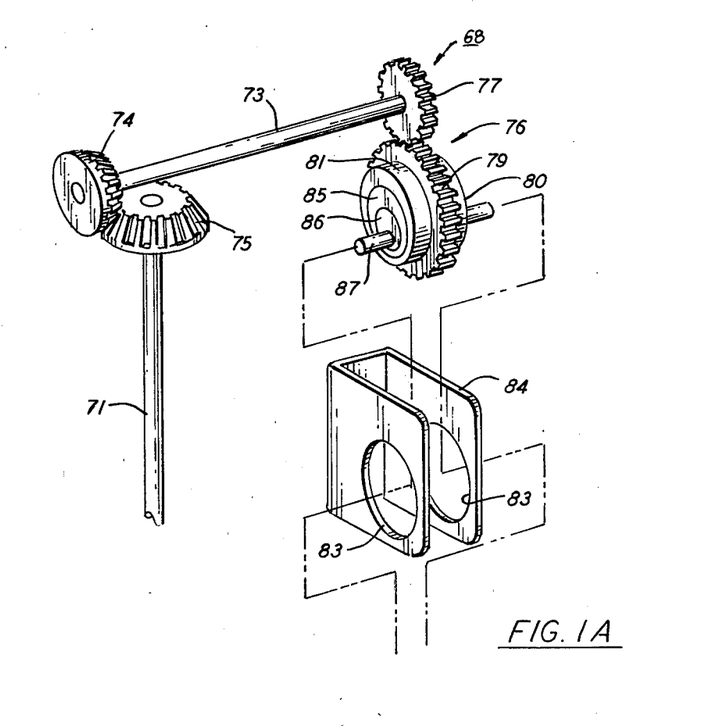
Figure 1B:
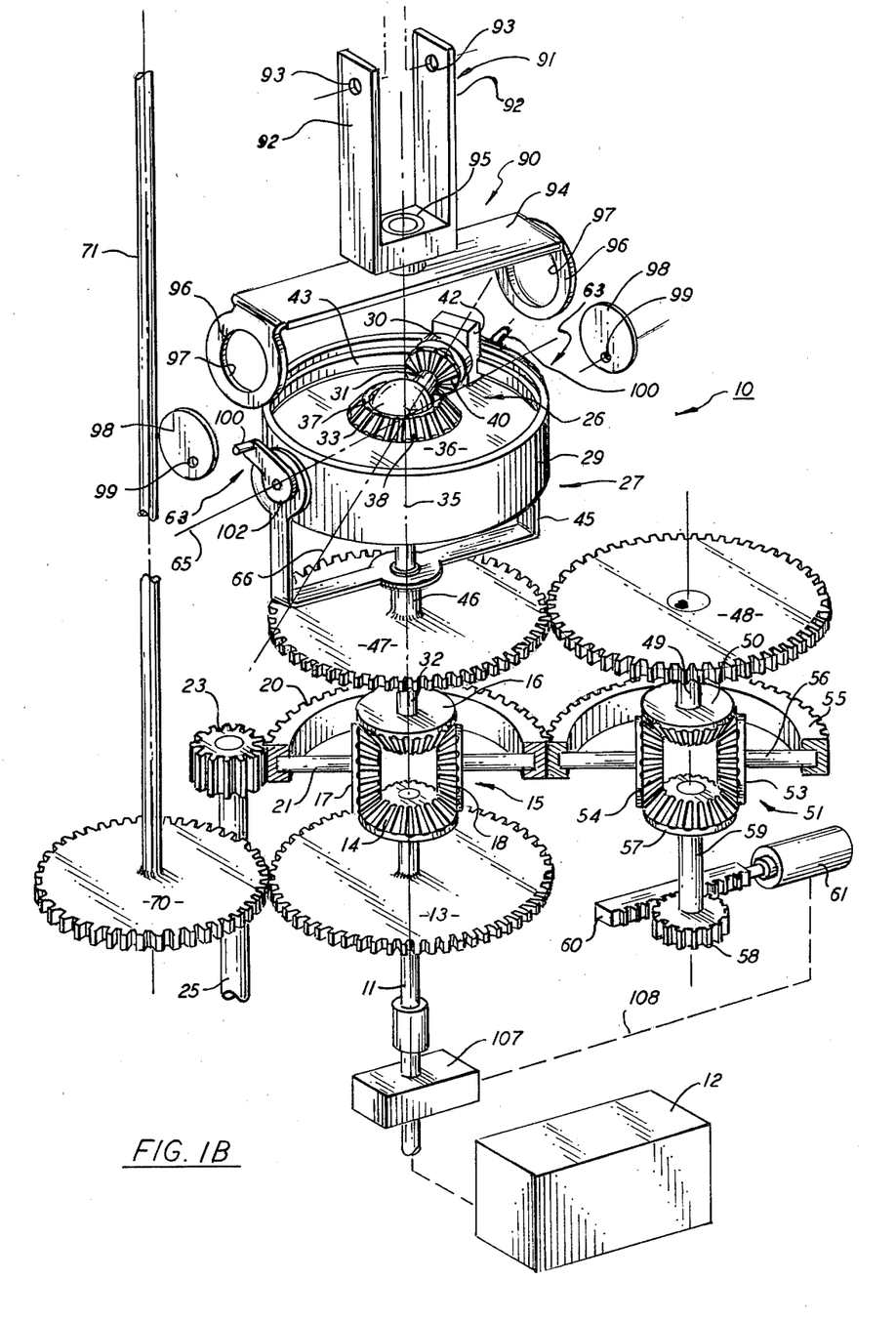

A yoke assembly, which is generally referenced 90, connects the inner gimbal ring 29 with the motion-converting assembly 76. The yoke contains a vertically-extended bifurcated member 91 that has a pair of arms 92—92 in which holes 93—93 are formed for receiving the ends of shaft 87. The arms of the bifurcated member pass upwardly along the outer walls of the stationary bracket. As the motion-converter assembly is turned by the drive gear system, the shaft 87 raises and lowers the yoke with a harmonic motion. The yoke further contains a cross member 94 that is rotatably secured in the bifurcated member by means of a precision bearing 95 so that the cross member can freely swing about the precessional axis of the gyroscope.

A pair of downwardly extended ears 96—96 having concentric holes 97—97 formed therein depend from either end of the cross member. In assembly, the ears extend along the side wall of the gimbal assembly perpendicular to the torque axis 65. A disc 98 is rotatably supported within the holes formed in the ears with each disc containing an offset opening 99 in which the actuating pin 100 of a rocker arm unit 101 is located. The two rocker arm units have a central trunnion 102 that is secured to the inner ring of the gimbal and is rotatably contained in the terminal end of the outer ring. The two trunnions are centered upon the torque axis 65 of the gimbal so that movement of the rocker arm units by the reciprocating yoke will cause the inner gimbal ring to rock about the torque axis. Through means of the noted gear system, the gimbal ring is caused to oscillate at some fixed multiple of engine speed.

For explanatory purposes, it shall herein be assumed that the inner ring of the gimbal is oscillated harmonically about the torque axis at a rate that is equal to the engine speed. Through means of the drive differential unit and the control differential unit, along with its associated gearing, the gimbal is caused to turn in a counter-clockwise direction as viewed in FIG. 1 at twice the wheel speed. At the same time, the output gear of the drive differential unit, acting through shaft 32, turns the spin axle of the gyroscope in a clockwise direction that is equal to the difference between the oscillation speed of the gimbal ring and its rotational speed. In other words, the spin axle of the gyroscope is moving counter to the gimbal at a rate equal to the engine speed minus twice the wheel speed. Accordingly, the spin axle crosses the torque axis of the gimbal twice for every turn of the engine shaft.

The amount of torque developed in the converter is related to the angular position of the spin axis in relation to the torque axis at the time the oscillating gimbal is in a horizontal position, that is, midway between its two extreme turn-around positions. When two axes are perpendicular at this time a maximum precessional torque is developed within the system. This precessional force acts in opposition to the direction of rotation of the gyroscopic spin axis and serves to load the output gear of the drive differential. This, in turn, causes a maximum amount of energy to be delivered to the loaded output shaft. This condition is referred to as maximum flux and the flux angle is 90°.

Minimum flux will occur when the flux angle is zero degrees. This means that the spin axis of the gyroscope crosses the torque axis when the gimbal ring is at a horizontal position. At this time the precessional forces are also minimum.

The flux angle in the present device can be controlled through means of the control cylinder 61. In operation, the stroke position of the cylinder is regulated by means of a flywheel governor 107 that is operatively attached to the engine drive shaft 11. The action of the flywheels, sensing the shaft speed, cause oil under pressure to be fed via line 108 to the cylinder which, in turn, produces a responsive instroking and outstroking of the rack, thus changing the flux angle of the converter.

Normally, the control cylinder will operate to hold the engine speed constant as the wheel or load speed is changing. In the event the engine speed begins to fall off due to insufficient development of energy, the governor sensing this condition moves the relative position of the gimbal in regard to gyroscope spin axle to a flux angle that will hold the engine speed at the original setting. It should be understood that if the engine does not have sufficient energy to maintain the desired engine speed, the flux angle will fall back from the maximum position after which power will have to be added to the engine more or less in the same manner as in a propeller driven airplane or a conventional automobile.

It should be further noted that the present converter also has the capability of providing a reverse drive function wherein the direction of rotation of the loaded output shaft is reversed. This occurs when the spin axle moves back from the maximum flux angle through the minimum flux angle into the quadrant beyond. Upon crossing the minimum flux position, the precessional torque acts 180° out of phase upon the drive differential whereupon the motion applied to wheels is reversed. By use of the control cylinder, a reversing function can be selected while the load is actually moving forward which applies a soft braking function to the load that can be used to effectively brake its motion.

The present apparatus also has the unique ability to feed energy back to the engine under certain operating conditions. This is achieved through the gimbal-rocking mechanism which, as previously noted, ties the engine drive shaft directly to the gimbal. In addition to a precessional torque, the gyroscope also produces what is sometimes called a rise torque that acts about the torque axis of the gimbal ring. This torque generally represents the residue of the engine output power that is not used in delivering power to the wheels. Although the timing of the oscillations are locked in by the mechanics of the rocking mechanism, there are times when the residue contained in the rise torque will predominate and this excess energy will be fed back through the mechanism to the engine drive shaft thereby easing the load upon the shaft.

Figure 3:
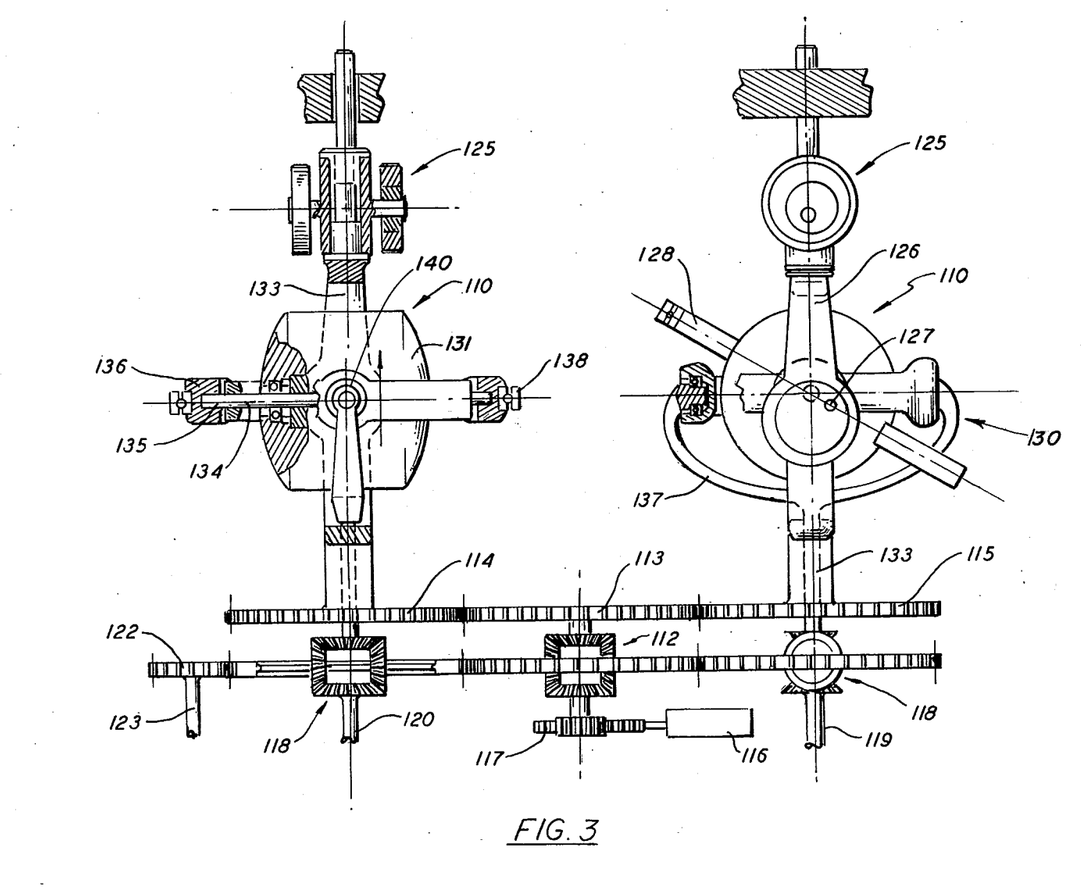
FIG. 3 is a second embodiment of the invention illustrating a pair of gimbal assemblies linked together to drive a common load.

Turning now to FIG. 3, there is shown in schematic form a second embodiment of the invention wherein the torque converter operates upon the same principle as discussed above. In this embodiment, the converter employs two separate gimbal assemblies, generally referenced 110, that are linked to a single control differential unit 112 via gear 113 acting in concert with gears 114 and 115 that turn the gimbal assemblies. Through the gear arrangement, one gimbal assembly is continually rotated 90° ahead of the other unit. The flux angle of each gimbal is controlled as explained above by the control cylinder 116 instroking or outstroking a rack 117.

The drive differential unit 118 that is coupled to each gimbal is driven from engine drive shafts 120—120 and the units can be connected to either one or a multiple of prime movers. The power output from the converter is taken off by a single pinion 122 acting in conjunction with a load output shaft 123. Although not completely shown, the engine input is used to rotate the motion-converting units 125 situated over the gimbal units. The motion-converting unit causes a slide unit 126 to rock the arm 127 and thus cause the outer gimbal ring 128 to oscillate within the gimbal assembly. The outer ring can thus be tipped to rock the torque axis 129 and thus set up the desired inertial forces.

The gyroscope contained in each gimbal unit is mounted in a housing 130 that includes an electrical variable speed motor 131. The motor is adapted to spin a single gyroscopic wheel (not shown) that is normally situated in the plane of the precessional axis 133. The spin axis 134 of the gyroscope lies along the axis of spin axle 135 which is contained in the frame 136. The frame is adapted to spin within the inner ring 137 of the gimbal within a precision bearing 138. A universal joint 140 can be used to connect the inner ring of the gimbal to the frame.

Although this second embodiment of the invention reverses the roles of the two gimbal rings and also employs a single gyroscopic wheel, the three main axes of the system remain in the same relative position as described above in regard to the first embodiment. As a result, the converter will function in the same manner to control the output thereof. This particular embodiment also provides for additional control over engine speed.

As can be seen, by varying the speed of the gyroscope wheel, the amount of torque delivered by the converter can be correspondingly varied which in turn furnishes an added degree of control over the engine speed required to drive a given load.

It should also be noted that by turning one gimbal 90° to the other as shown in FIG. 3 it eliminates, to a great extent, unbalanced forces in the system that are created due to gyroscopically induced torques.

Figure 4:
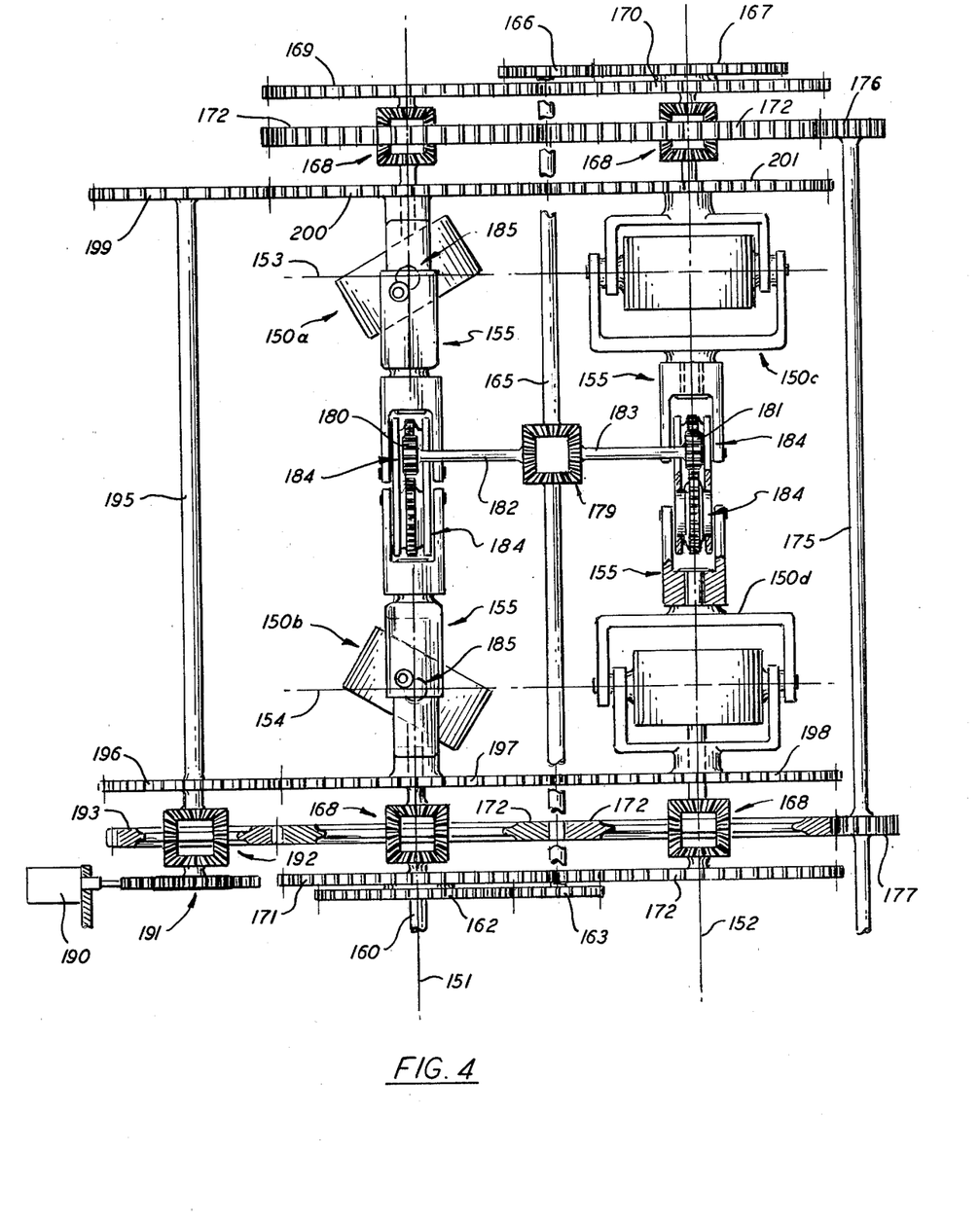
FIG. 4 is a further embodiment of the invention showing four gimbal assemblies linked together to drive a common load.

Turning now to FIG. 4 there is shown a still further embodiment of the invention in which four separate gimbal assemblies are connected together so as to eliminate unbalanced conditions within the system that might be caused by ocsillating gimbal mechanism and gyroscopic torques produced by the rotational parts. As can be seen in FIG. 4, the four individual gimbal assemblies 150—150 are mounted in a square pattern. A first vertically aligned pair of assemblies 150a and 150b share a comon precessional axis 151 while a second vertically aligned pair 150c and 150d share a common precessional axis 152. The upper two assemblies, 150a and 150c, also share a common torque axis 153 and the lower two assemblies share torque axis 154.

Through the associated gimbal-rocking mechanism the right hand pair of vertically aligned gimbals are in a horizontal position when the left hand pair are each reaching their respective extreme tilt positions. In both vertical pairs the slide mechanisms 155—155 that control the rocking of the gimbals are moved in opposition to each other. As can be seen, by this arrangement, the mechanical unbalancing forces produced by the slide action tend to cancel each other thereby providing for a smooth running unit.

Similarly, the gimbal assemblies 150c and 150d positioned on the left side of the system are turned 90° in regard to the right-hand pair 150a and b. Accordingly, each assembly will reach maximum flux at differing intervals. It should be noted that the upper two assemblies rotate in opposition to each other as do the lower two assemblies. The net effect of this arrangement is to offset the inertial forces acting on the system to further enhance the operating characteristics of the system.

The present system utilizes a single input drive shaft 160 that is connected to a prime mover. Acting through a first gear pair 162, 163, shaft 165 and a second gear pair 166 and 167 provides input power to the four drive differential units 168-168. The input to the upper pair of drive units are connected via gears 169 and 170 while the two lower units are similarly connected via gears 171 and 172. As explained above, the output of each differential drive unit is coupled to the associated spin axle of the gimbal mounted gyroscope and serves to move the axle independent of the gimbal. Again, the planetary sections 172—172 of the upper drive units are held in meshing contact as are the two lower units. The drive differentials acting through the planetary sections are coupled to a loaded output shaft 175 through means of an upper pinion 176 and a lower pinion 177.

The motion of each slide is coordinated from shaft 165 through means of a differential unit 179 that drives gears 180 and 181 through shafts 182 and 183. The two gears 180 and 181 each drive the motion-converting assembly 184 associated with a pair of opposed slides to maintain the slide motion 90° out of phase. A rocker arm assembly 185, as described above, is also connected to each slide and serves to oscillate the gyroscope containing ring about its torque axis.

A single control cylinder 190 is used to operate a rack and pinion unit 191 that is coupled to a control differential unit 192. The planetary section 193 of the control differential is connected as explained above to that of one of the drive units. The output gear of the control differential is affixed to shaft 195. Instroking or outstroking of the rack causes the flux angle of each unit to be altered via gear trains 196-198 and 199-201. Although not shown, the cylinder is typically regulated through means of a governor unit operatively connected to the prime mover.

While this invention has been described with reference to the details as set forth above, it is not limited to the specific structure as disclosed and the invention is intended to cover any modifications or changes as may come within the scope of the following claims.

I claim:

1. The method of transmitting energy from a prime mover to a loaded output shaft that includes the steps of
   mounting a gyroscope within a gimbal unit with the precessional axis of the gyroscope being coaxially aligned with a central axis of the gimbal unit,
   turning the wheel of the gyroscope at a relatively high speed to create inertial forces in the gyroscope,
   connecting the spin axis of the gyroscope to the output gear of a differential drive unit,
   connecting the input gear of the differential drive unit to the prime mover,
   meshing a planetary gear section to the input and output gears of the differential drive unit and coupling the section to the loaded output shaft,
   rocking one ring of the gimbal to oscillate the gyroscope about a torque axis that is perpendicular to the precessional axis whereby a precessional force is applied to the output gear of the differential,
   turning the entire gimbal about the precessional axis, and
   matching the oscillation frequency of the gimbal ring to the frequency at which the spin axis of the gyroscope crosses the torque axis of the gimbal.

2. The method of claim 1 wherein the gimbal ring is oscillated at a speed that is a fixed multiple of the speed of the prime mover and the gimbal is turned at a speed that is some fixed multiple of the loaded shaft speed.

3. The method of claim 2 wherein the gimbal ring is oscillated at engine speed and the gimbal is turned at twice the loaded shaft speed.

4. The method of claim 3 wherein the spin axis is rotated in a direction that is opposite to the direction of turning of the gimbal whereby the spin axis of the gyroscope crosses the torque axis of the rockable gimbal ring twice for each complete oscillation of the ring.

5. The method of claim 4 including the further step of adjusting the time at which the spin axis crosses the torque axis.

6. The method of claim 1 including the further step of sensing the speed of the prime mover and adjusting the relative angular position of the gimbal unit with respect to the spin axis of the gyroscope in response to the prime mover speed to maintain the speed constant as the load on the loaded output shaft varies.

7. The method of transmitting energy from an engine to a loaded output shaft including
   mounting a gyroscope within a gimbal unit to permit the gyroscope to spin about a spin axis and tilt about a torque axis that pass through the precessional axis of the gyroscope, rocking the gyroscope at engine speed,
turning the gimbal about the precessional axis at the output shaft speed,
rotating the gyroscope spin axis about the precessional axis in a direction opposite to the direction of turning of the gimbal at a speed that is equal to the oscillation speed less once the gimbal speed whereby precessional forces are created in the gyroscope,
utilizing the precessional torque to regulate the amount of energy transmitted from the engine to the loaded output shaft.

8. The method of claim 7 wherein the precessional torque generated in the gyroscope is applied to a differential drive unit that is arranged to couple the engine drive to the loaded shaft.

9. The method of claim 7 that further includes mounting a pair of gyroscopic wheels upon a spin axle so that the wheels are adapted to spin about said axis.

10. The method of claim 8 that further includes adjusting the relative angular position of the gimbal in regard to tilt position of gyroscope to regulate the engine speed.

11. A torque converter having an infinitely variable ratio of input to output speeds that includes
a differential drive unit having an input gear connected to a prime mover, an output gear connected to the spin axle of a gyroscope having at least one wheel and a planetary gear section interposed between the input and output gears that is coupled to a loaded output shaft whereby the planetary section turns at a rate that is proportional to the rotation of the input and output gears,
means to spin the said at least one wheel of the gyroscope at a speed sufficient to develop gyroscopic forces,
a gimbal mounted for rotation about the precessional axis of the gyroscope having one ring in which said spin axle of the gyroscope may turn independent of the gyroscope motion,
oscillating means connected to said ring for rocking the ring about a torque axis that is perpendicular to the percessional axis of the gyroscope whereby a precessional torque is applied to the output gear of the differential drive unit, and
drive means for turning the gimbal about the precessional axis at a speed that is some multiple of the loaded output shaft speed whereby a precessional force is applied to the differential drive unit.

12. The torque converter of claim 11 that further includes an adjusting means for angularly positioning the gimbal in regard to the spin axis of the gyroscope so that the amount of precessional torque applied to the differential drive unit can be closely controlled.

13. The torque converter of claim 11 wherein said oscillator means rocks the said one ring of the gimbal at a rate that is a fixed multiple of the prime mover speed.

14. The torque converter of claim 13 wherein said oscillator includes
a rocker arm secured to said one ring of the gimbal,
a lifting means for actuating the rocker arm whereby the ring is titled about the torque axis,
motion-converting means linking the lifting arm to the prime mover for converting the motion of the prime mover to a reciprocal motion for driving the lifting means along a linear path of travel.

15. The torque converter of claim 11 wherein said gyroscope includes a pair of wheels rotatably supported upon the spin axle with each wheel being spaced an equal distance from the precessional axis.

16. The torque converter of claim 15 that further includes a gear means for imparting a spin to the wheels as the spin axle is rotated about the precessional axis.

17. The torque converter of claim 11 wherein said gyroscope includes a single wheel rotatably supported upon the spin axle, said wheel being centered upon the precessional axis for rotation and tilting thereabout.

18. The torque converter of claim 17 that further includes a variable speed electric motor mounted upon the spin axle of the gyroscope for rotation therewith, said motor further being coupled to the wheel for spinning the wheel about the spin axle.

19. The torque converter of claim 12 wherein said adjusting means further includes
a gimbal drive gear secured to the gimbal to turn about the precessional axis of the gyroscope,
a second control differential unit having an output gear connected to the gimbal drive gear, an input gear connected to a speed adjuster for setting the position of said input gear in response to the speed of the prime mover, and a planetary gear section interposed between the input and the output gears that is coupled to the planetary section of the differential drive unit so as to turn at the same speed therewith.

20. The torque converter of claim 19 that further includes a governor operatively secured to the prime mover for sensing the speed thereof and regulating the positioning of the input gear to the differntial control unit in response thereto.

21. A torque converter including
a plurality of differential drive units each containing an input gear connected to a prime mover, an output gear connected to the spin axle of a gyroscope for rotating the axle about the precessional axis of the gyroscope, and a planetary section interposed between the input and output gears,
each of the planetary gear sections being operatively coupled to a single loaded output shaft,
means to tip each of the gyroscopes in a controlled order whereby a precessional torque is applied to each of the differential drive units.

22. The torque converter of claim 21 wherein each of the gyroscopes is mounted for independent movement about its own precessional axis within a gimbal.

23. The torque converter of claim 22 wherein the gyroscope is further mounted within one ring of the gimbal that is arranged to oscillate the gyroscope about a torque axis that is perpendicular to the precessional axis.

24. The torque converter of claim 23 that further includes an oscillator means connected to each of the said one rings of the gimbals for rocking said one ring about the torque axis, and means for driving the oscillator from the prime mover whereby the ring is oscillated at a speed that is fixed multiple of the prime mover speed.

25. The torque converter of claim 24 that further includes a drive means associated with each of the gimbal means for turning the gimbals about the precessional axis of the gyroscope contained therein at a rate that is a fixed multiple of the loaded output shaft speed.

26. The torque converter of claim 25 having an adjusting means for angularly positioning each gimbal in respect to the angular position of the spin axle of the gyroscope contained therein whereby the magnitude of the precessional torque applied to the associated differential drive unit is regulated.

27. The torque converter of claim 26 that further includes timing means operatively associated with each oscillator means whereby each gyroscope exerts a maximum torque upon the associated differential drive at a different point in time.

28. A torque converter that includes a differential drive unit having an input gear connected to an engine shaft, an output gear connected to the spin axle of a gyroscope having a wheel capable of being rotated at relatively high speeds and a planetary section for connecting the input and output gears that contains a ring gear arranged to drive a loaded output shaft, a gimbal for supporting the gyroscope in one ring thereof so that the spin axle of the gyroscope can independently turn about its precessional axis and oscillating means for rocking the ring of the gyroscope about a torque axis that is perpendicular to the precessional axis of the gyroscope at a rate that is a fixed multiple of the prime mover speed, and means to turn the gimbal about the precessional axis of the gimbal at a rate that is some fixed multiple of the loaded output shaft speed.

29. The torque converter of claim 28 that further includes an automatic adjusting means for continually adjusting the angular position of the gimbal in response to the engine shaft speed to hold the engine speed constant as the load on the output shaft changes.

* * * * *